(12) United States Patent
Nagata

(10) Patent No.: US 8,589,740 B2
(45) Date of Patent: Nov. 19, 2013

(54) SYSTEM, METHOD AND COMPUTER PROGRAM PRODUCT FOR TESTING AN ASPECT OF A USER INTERFACE DETERMINED FROM A DATABASE DEDICATED TO THE TESTING

(75) Inventor: Yudi Nagata, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 450 days.

(21) Appl. No.: 13/006,377

(22) Filed: Jan. 13, 2011

(65) Prior Publication Data

US 2011/0219273 A1 Sep. 8, 2011

Related U.S. Application Data

(60) Provisional application No. 61/309,715, filed on Mar. 2, 2010.

(51) Int. Cl.
*G06F 11/00* (2006.01)

(52) U.S. Cl.
USPC .......................................................... 714/46

(58) Field of Classification Search
USPC .......................................................... 714/46
See application file for complete search history.

(56) References Cited

U.S. PATENT DOCUMENTS

| | | |
|---|---|---|
| 7,209,929 B2 | 4/2007 | Dominguez, Jr. et al. |
| 7,409,388 B2 * | 8/2008 | Dunki et al. ................. 717/124 |
| 7,698,160 B2 | 4/2010 | Beaven et al. |
| 8,024,299 B2 * | 9/2011 | Dias et al. ....................... 707/660 |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 8,392,880 B2 * | 3/2013 | Ahadian et al. ............... 717/115 |
| 2003/0084401 A1 * | 5/2003 | Abel et al. ................. 715/501.1 |
| 2003/0233404 A1 | 12/2003 | Hopkins |
| 2005/0065925 A1 | 3/2005 | Weissman et al. |
| 2005/0172267 A1 * | 8/2005 | Bergin ........................... 717/124 |
| 2005/0223022 A1 | 10/2005 | Weissman et al. |
| 2005/0283478 A1 | 12/2005 | Choi et al. |
| 2005/0283667 A1 * | 12/2005 | Batten et al. ...................... 714/25 |
| 2006/0059149 A1 * | 3/2006 | Dunki et al. ........................ 707/6 |
| 2006/0059189 A1 * | 3/2006 | Dunki et al. .................. 707/102 |
| 2006/0206834 A1 | 9/2006 | Fisher et al. |
| 2008/0270980 A1 * | 10/2008 | Ahadian et al. ............... 717/109 |
| 2008/0295076 A1 * | 11/2008 | McKain et al. ............... 717/124 |
| 2011/0088018 A1 * | 4/2011 | Foley et al. .................... 717/131 |
| 2012/0210209 A1 * | 8/2012 | Biddle .......................... 715/234 |

OTHER PUBLICATIONS

U.S. Appl. No. 60/828,192, filed Oct. 4, 2006.

* cited by examiner

*Primary Examiner* — Bryce Bonzo
(74) *Attorney, Agent, or Firm* — Zilka-Kotab, PC

(57) ABSTRACT

In accordance with embodiments, there are provided mechanisms and methods for testing an aspect of a user interface determined from a database dedicated to the testing. These mechanisms and methods for testing an aspect of a user interface determined from a database dedicated to the testing can provide a testing dedicated database of aspects of a user interface. The ability to provide a testing dedicated database of aspects of a user interface can enable testing of the user interface without the limitations otherwise associated with a database of aspects of the user interface that is utilized when publishing the database.

18 Claims, 5 Drawing Sheets

SYSTEM, METHOD AND COMPUTER PROGRAM PRODUCT FOR TESTING AN ASPECT OF A USER INTERFACE DETERMINED FROM A DATABASE DEDICATED TO THE TESTING

CLAIM OF PRIORITY

This application claims the benefit of U.S. Provisional Patent Application 61/309,715 entitled "Method And System For Writing Isolated Automated Testing User interface," by Yudi Nagata, filed Mar. 2, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to testing user interfaces.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Conventionally, a user interface is tested for verifying the functionality of the user interface. Unfortunately, the testing of a user interface is typically tied to the backend data utilized to generate and publish the user interface to users. For example, values of viewable components of the user interface, which are generally the aspects of the user interface being tested, are typically determined from a database also utilized to determine the values when the user interface is being published for use by users. Thus, any limitations associated with determining the values from the database that result when publishing the user interface, such as delays, failures in determining the values, etc. are also present when testing the user interface.

Accordingly, it is desirable to provide techniques enabling a user interface to be tested by determining aspects of the user interface to be tested from a database that is dedicated to the testing.

BRIEF SUMMARY in accordance with embodiments, there are provided mechanisms and methods for testing an aspect of a user interface determined from a database dedicated to the testing. These mechanisms and methods for testing an aspect of a user interface determined from a database dedicated to the testing can enable embodiments to provide a testing dedicated database of aspects of a user interface. The ability of embodiments to provide a testing dedicated database of aspects of a user interface can enable testing of the user interface without the limitations otherwise associated with a database of aspects of the user interface that is utilized when publishing the database.

In an embodiment and by way of example, a method for testing an aspect of a user interface determined from a database dedicated to the testing is provided. In use, a user interface having at least one aspect determined from a first database during production of the user interface is identified. Additionally, the at least one aspect of the user interface is determined from a second database. Furthermore, the at least one aspect of the user interface determined from the second database is tested.

While one or more implementations and techniques are described with reference to an embodiment in which testing an aspect of a user interface determined from a database dedicated to the testing is implemented in a system having an application server providing afoot end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Figure 1:
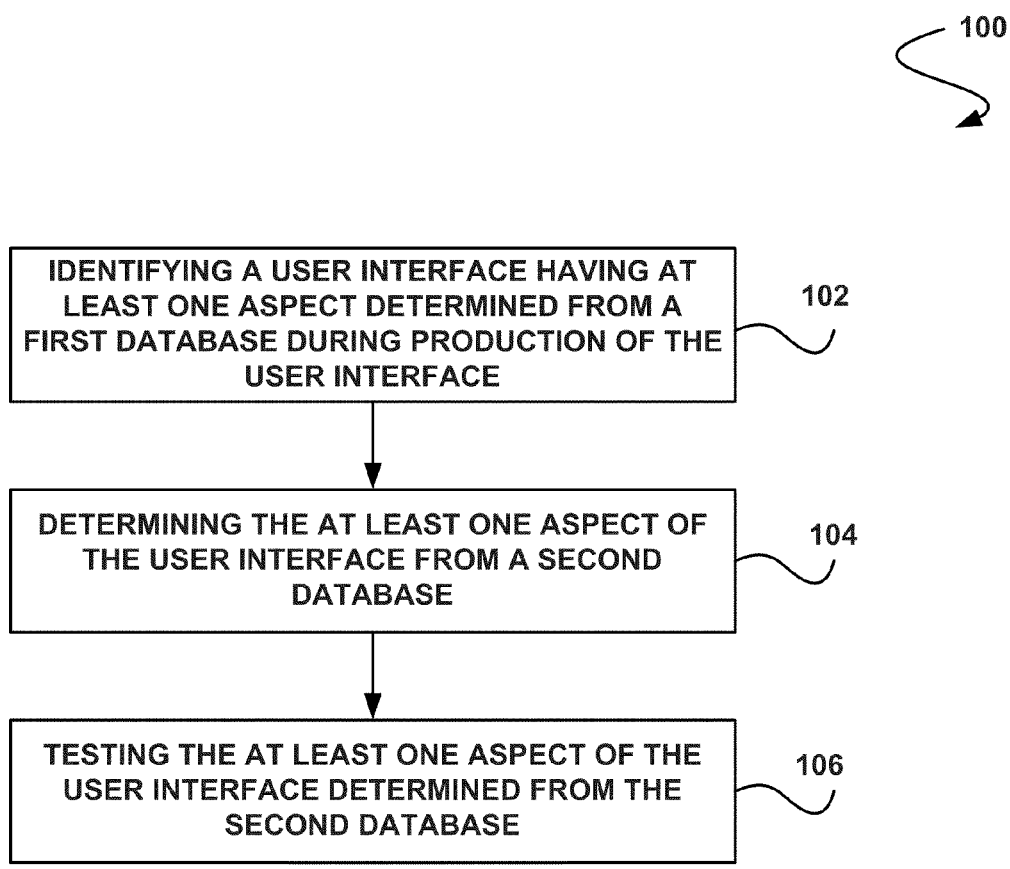
FIG. 1 illustrates a method for testing an aspect of a user interface determined from a database dedicated to the testing, in accordance with an embodiment.

Systems and methods are provided for testing an aspect of a user interface determined from a database dedicated to the testing.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for providing testing an aspect of a user interface determined from a database dedicated to the testing will be described with reference to example embodiments.

illustrates a method 100 for testing an aspect of a user interface determined from a database dedicated to the testing, in accordance with an embodiment. As shown in operation 102, a user interface having at least one aspect determined from a first database during production of the user interface is identified. In the context of the present embodiment, the user interface includes any interface capable of being viewed, interacted with, etc. by a user. For example, the user interface may include a graphical user interface (GUI), web page, etc.

To this end, the aspect of the user interface may include any component of the user interface that is viewable to a user. As an option, the aspect may be capable of being interacted with (e.g. selected, etc.) by the user. For example, the aspect may include a visible aspect of a GUI.

In one embodiment, the aspect may include text displayed on the user interface. In another embodiment, the aspect may include an error message displayed utilizing the user interface (e.g. in response to an error condition associated with the first database occurring during the production of the user interface). In other various embodiments, the aspect may include a button, drop down menu, etc.

As noted above, the aspect is determined from a first database during production of the user interface. Production of the user interface may include any publication of the user interface for use by a user. For example, production of the user interface may include executing code utilized for generating the user interface for display to the user.

Accordingly, the first database may be associated with the production of the user interface for use in determining the aspect of the user interface. In one embodiment, the first database may store data indicative of the aspect of the user interface, such as visual attributes (e.g. font, size, text, etc.) of the aspect. Thus, the aspect of the user interface may optionally be directly determined (e.g. read) from the first database.

In another embodiment, the first database may store data, which when processed indicates the aspect of the user interface. For example, the first database may store data required to be processed to generate output, where such output is utilized during the production of the user interface in determining the aspect of the user interface. In yet another embodiment, the aspect of the user interface may be determined during the production of the user interface based on a plurality of transactions performed utilizing the first database (e.g. performed on data stored in the first database).

As an option, the first database may be a shared database. In one embodiment, the database may be shared among tenants of a multi-tenant on-demand database system. In another embodiment, the database may be shared among various different applications (e.g. user interfaces, etc.).

Additionally, as shown in operation 104, the at least one aspect of the user interface is determined from a second database. In this way, the aspect of the user interface may be determined from a second database that is different from the first database from which the aspect of the user interface is determined during production of the user interface. In one embodiment, the aspect of the user interface may be determined from the second database for testing the user interface (e.g. as opposed to the production of the user interface), as described in more detail below.

To this end, determining the aspect of the user interface from the second database may be performed in response to a determination that the user interface is to be tested. For example, the second database may be unique to a test utilized for testing the aspect of the user interface. Thus, the second database may store data directly utilized by the test, such as the data indicative of the aspect of the user interface. Just by way of example, the second database may store data that is mocked up specifically for the test.

In one embodiment where the aspect is an error message displayed utilizing the user interface (e.g. in response to an error condition associated with the first database occurring during the production of the user interface), the second database may store the error message for determining the aspect of the user interface from the second database. For example, the aspect of the user interface which includes the error message may be directly read from the second database (e.g. without requiring the error condition otherwise associated with the error message to occur).

In another embodiment where the first database stores data required to be processed to generate output, and where such output is utilized during the production of the user interface in determining the aspect of the user interface, the second database may store an instance of the output for use in determining the aspect of the user interface from the second database. Again, this may allow the aspect to be directly determined (e.g. read) from the second database, thereby avoiding the processing otherwise required when utilizing the first database to determine the aspect of the user interface.

In yet another embodiment where the aspect of the user interface is determined during the production of the user interface based on a plurality of transactions performed utilizing the first database, the aspect of the user interface may be determined from the second database by directly reading the aspect from the second database. This may allow execution of the plurality of transactions otherwise associated with determining the aspect from the first database to be avoided.

Furthermore, as shown in operation 106, the at least one aspect of the user interface determined from the second database is tested. With respect to the present description, testing the aspect determined from the second database may include any type of validation associated with the aspect. Optionally, the testing may be performed by generating the user interface utilizing the aspect determined from the second database and validating that the user interface was generated as expected.

In one embodiment, the testing may include validating functionality of the aspect of the user interface. In another embodiment, the testing may include validating that an update to the aspect of the user interface was implemented as expected. In yet another embodiment, the testing may include validating a behavior of the aspect of the user interface.

By determining an aspect of a user interface from the second database, which is separate from the first database utilized during production of the user interface, the aspect of the user interface may be tested without the limitations otherwise associated with the first database. For example, delays or even failures in determining the aspect from the first database (e.g. due to multiple other transactions occurring on the first database, due to bandwidth limitations associated with the first database, due to an error within the first database, etc.) may be avoided. In particular, the data needed for determining the aspect to be tested may be directly retrieved from the second database, which may optionally be dedicated for use when testing the user interface.

Figure 2:
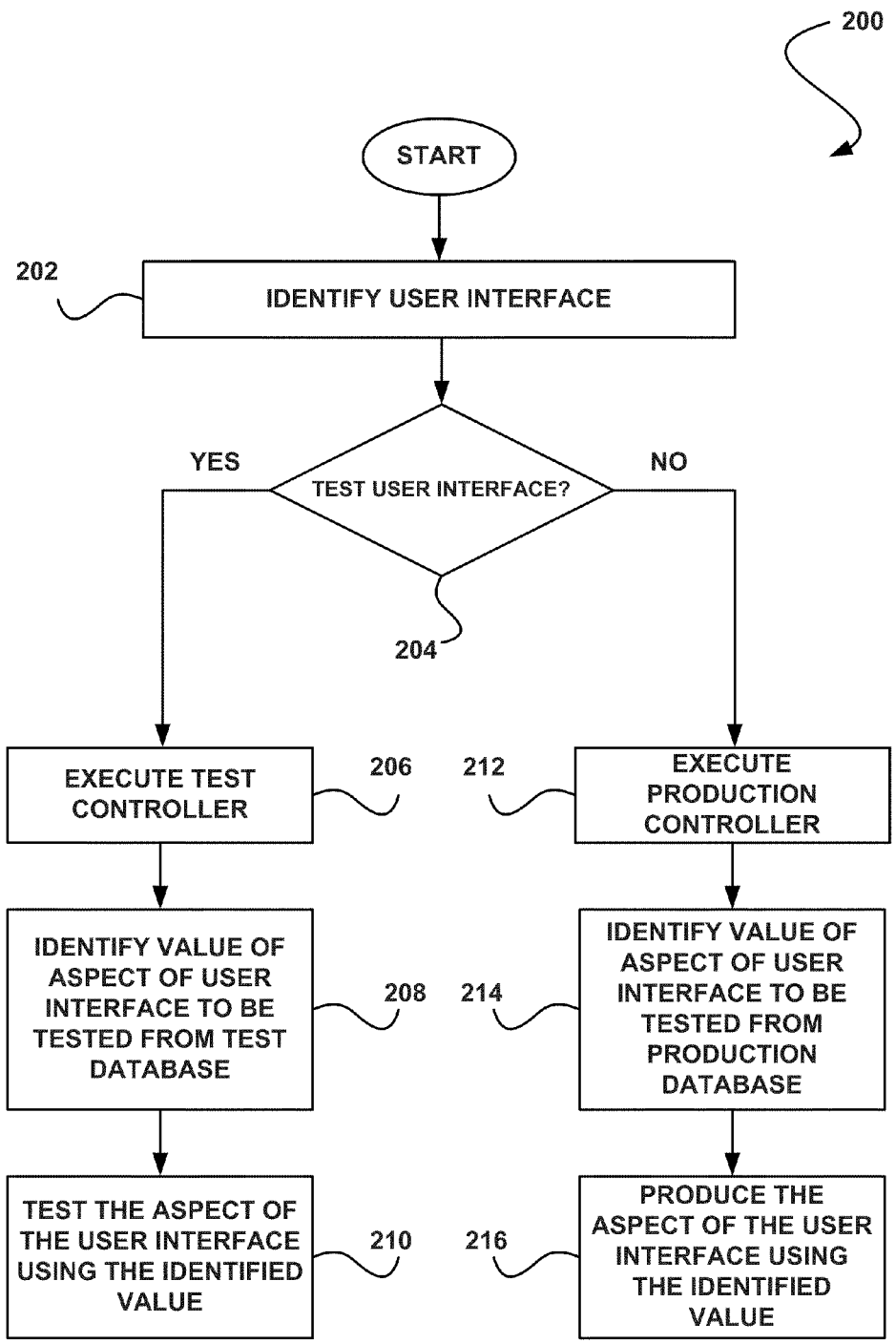
FIG. 2 illustrates a method for selecting a test controller associated with a user interface for testing the user interface, in accordance with an embodiment.

FIG. 2 illustrates a method 200 for selecting a test controller associated with a user interface for testing the user interface, in accordance with an embodiment. As an option, the present method 200 may be carried out in the context of the functionality of FIG. 1. Of course, however, the method 200 may be carried out in any desired environment. The aforementioned definitions may apply during the present description.

As shown in operation 202, a user interface is identified. In the present embodiment, the user interface includes a GUI having at least one aspect that is visible to a user. For example, the user interface may include a GUI associated with an application or a GUI displaying a web page.

Optionally, the user interface may be identified in response to an access request to the user interface. For example, the user interface may be accessed for production (e.g. for providing the user interface for use by a user). As another example, the access request may be accessed for testing.

As shown in decision 204, it is determined whether the user interface is to be tested, As noted above, the user interface may be accessed for testing or production. Thus, in one embodiment, if the user interface is accessed for testing, it may be determined that the user interface is to be tested. Optionally, the determination may include determining whether the user interface is to be tested or published for use by at least one user.

In response to a determination that the user interface is to be tested, a test controller is executed. Note operation 206. With respect to the present embodiment, the test controller may include any code component capable of being utilized to test the user interface, in the manner described below. For example, the test controller may include a model-view-controller utilized for testing the user interface.

Further, as shown in operation 208, a value of an aspect of the user interface that is to be tested is identified from a test database. Such test database may include any database storing data indicative of aspects of the user interface which is specific to a test to be performed on the user interface. For example, the test database may store the value of the aspect, such that the value may be directly read from the test database. In this way, the test controller may access the test database for determining the aspect of the user interface from the test database.

It should be noted that the test database may be separate from a production database storing data associated with (e.g. capable of being utilized to derive, etc.) aspects of the user interface that is utilized for generating the user interface for use by a user. In one embodiment, the aspect of the user interface may include a specific aspect of the user interface that is tested by the test. In the test database, the value may be associated with the aspect, such that the value may be identified for the aspect for testing purposes. Accordingly, the test database may optionally only store values for aspects of the user interface that are to be tested.

In addition, the aspect of the user interface is tested using the identified value, as shown in operation 210. For example, functionality of the aspect may be tested by generating the aspect based on the value and determining whether the generated aspect meets preconfigured criteria. It should be noted that in the present embodiment the user interface may be tested by testing any desired number of different aspects of the user interface, based on values of such aspects identified from the test database.

As shown with respect to decision 204, if it is determined that the user interface is not to be tested, a production controller is executed. Note operation 212. For example, if it is determined that the user interface is not to be tested, it may automatically be determined that the user interface is to be published for use by at least one user. In the present embodiment, the production controller may include any code component capable of being utilized to generate the user interface for use by a user, in the manner described below. For example, the production controller may include a model-view-controller utilized for producing the user interface.

To this end, the user interface may be associated with two controllers, the test controller and the production controller. Each of the test controller and the production controller may be utilized to perform different functionality with respect to a single instance of the user interface. For example, the test controller may perform testing with respect to the user interface, whereas the production controller may publish the user interface for use by a user. In this way, a single instance of the user interface may be utilized during production of the user interface and testing of the user interface.

Moreover, as shown in operation 214, a value of the aspect of the user interface is identified from a production database. As noted above, the production database is separate from the test database, and stores data associated with (e.g. capable of being utilized to derive, etc.) aspects of the user interface that is utilized for generating the user interface for use by a user. Accordingly, the production database may store data for deriving all aspects of the user interface (e.g. and not necessarily only the aspects being tested, as described above with respect to the test database), such that the production database may optionally include a larger set of data than the test database.

For example, the production controller may access the production database for determining the aspect of the user interface from the production database. In one embodiment, the production database may store data required to be processed in order to result in the value of the aspect. In another embodiment, the production database may store data on which multiple transactions must be performed in order to result in the value of the aspect. To this end, the production database may not necessarily store the value of the aspect, such that the value may not necessarily be capable of simply being read from the production database.

Still yet, the aspect of the user interface is published using the value identified from the production database, as shown in operation 216. For example, the aspect of the user interface may be generated using the value identified from the production database. Such generated aspect may then be displayed for user by a user.

Figure 3:
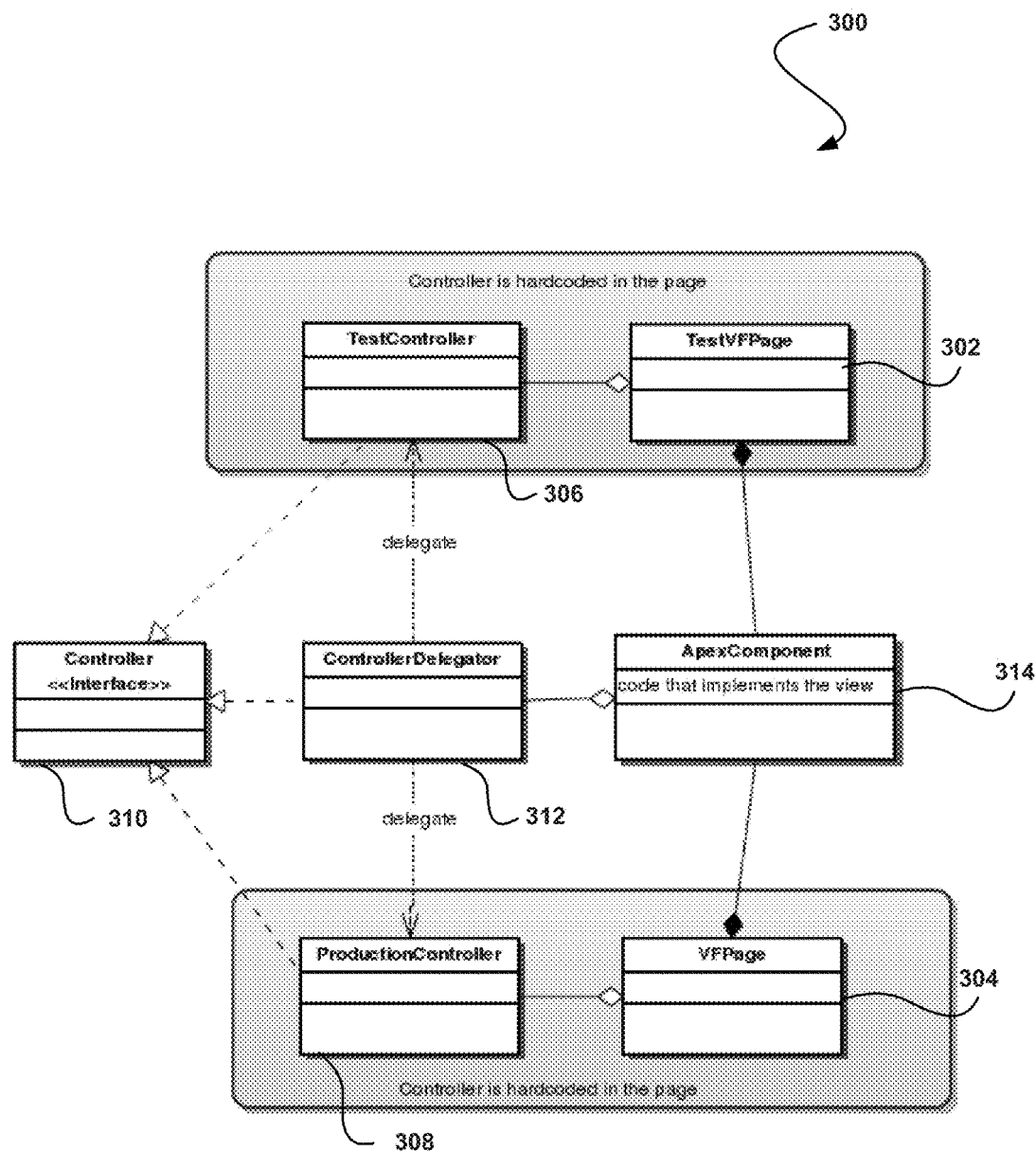
FIG. 3 illustrates classes for selecting a test controller associated with a user interface for testing the user interface, in accordance with an embodiment.

FIG. 3 illustrates a set of classes 300 for selecting a test controller associated with a user interface for testing the user interface, in accordance with an embodiment. As an option, the set of classes 300 may be implemented in the context of the functionality of FIGS. 1-2. Of course, however, the set of classes 300 may be implemented in any desired environment. Again, the aforementioned definitions may apply during the present description.

The present set of classes 300 implement a model-view-controller design for use with testing and producing a user interface. Optionally, if an existing user interface is not built according to the model-view-controller design, the user interface may be automatically modified to conform to the design described with respect to the present embodiment. As shown, a test page 302 and a production page 304 are each associated with a single instance of a user interface (not shown). Each of the test page 302 and the production page 304 may represent a different view of the user interface.

For example, the test page 302 may represent a view of the user interface generated based on user interface aspects determined from a test database, whereas the production page 304 may represent a view of the user interface generated based on user interface aspects determined from a production database. Such test database may store data utilized specifically for testing the user interface (i.e. the view represented by the test page 302), and the production database may store data utilized for producing the user interface (i.e. the view represented by the production page 304) for use by a user.

A test controller 306 is hard coded in the test page 302, and a production controller 308 is hard coded in the production page 304. Each of the test controller 306 and the production controller 308 implement a controller interface 310 for performing respective functionality. In one embodiment, the test controller 306 implements the controller interface 310 for testing the user interface. In another embodiment, the production controller 308 implements the controller interface 310 for producing the user interface for use by a user.

Further, a controller delegator 312 determines whether control is passed to the test controller 306 or the production controller 308. As shown, the controller delegator 312 is a component of code 314 that implements the test page 302 and the production page 304. In one embodiment, the controller delegator 312 may determine whether to pass control to the test controller 306 or the production controller 308 based on the view that is to be generated. For example, if the test page 302 is to be generated, the controller delegator 312 may pass control to the test controller 306, whereas if the production page 304 is to be generated, the controller delegator 312 may pass control to the production controller 308.

To this end, a single instance of code 314 may utilize the controller delegator 312 to swap between generating different views of a single user interface, namely the test page 302 and the production page 304, based on a purpose for generating the view. For example, the test page 302 may be generated for the purpose of testing the user interface. As another example, the production page 304 may be generated for the purpose of producing the user interface for use by a user.

in one embodiment, the test page 302 may be generated in response to an update made to an aspect of the user interface, such that the update may be tested. Of course, the test page 302 may be generated for any desired testing of the user interface. In another embodiment, the production page 304 may be generated in response to a successful result of the testing (e.g. a validation of the functionality, components, etc. of the user interface).

System Overview

Figure 4:
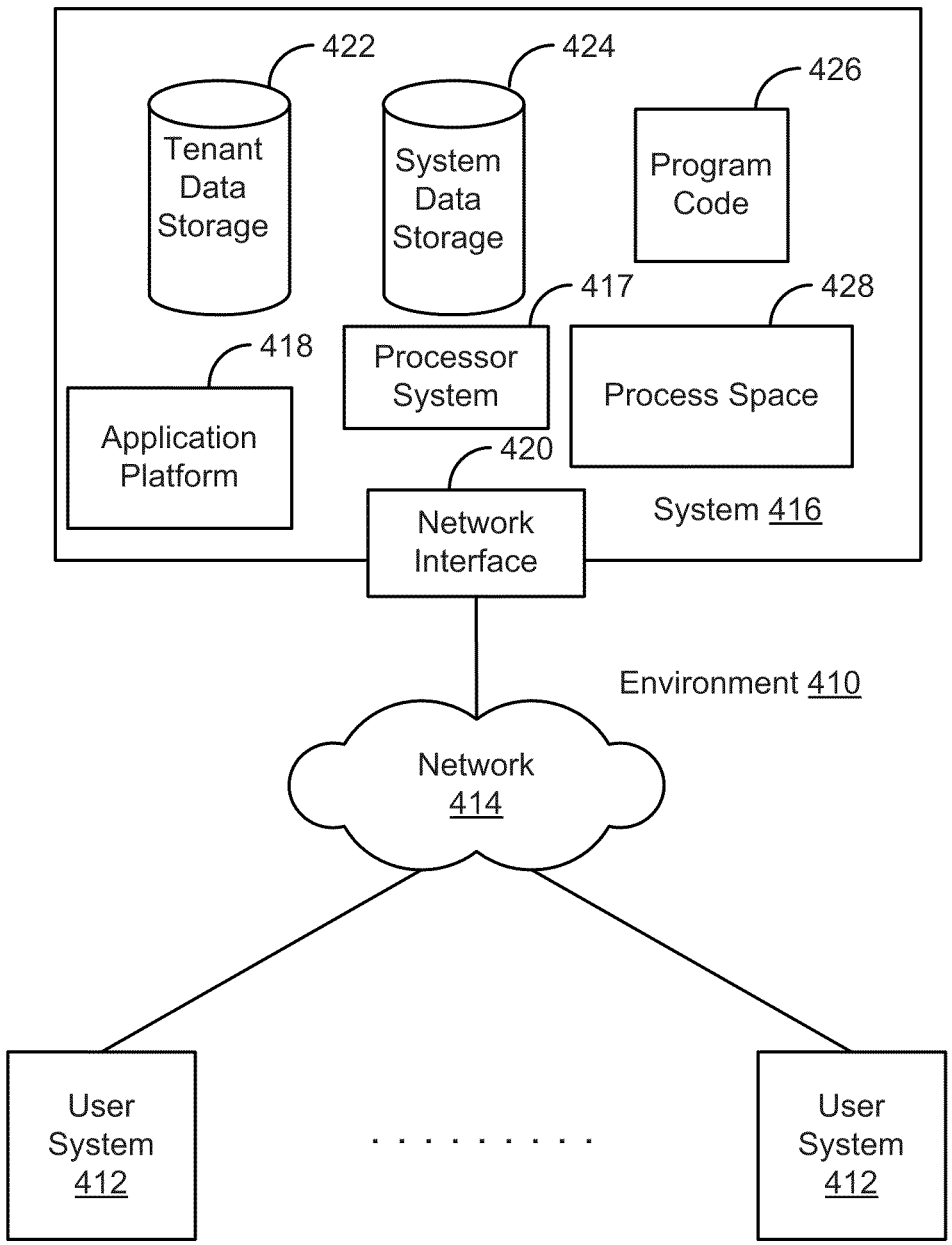
FIG. 4 illustrates a block diagram of an example of an environment wherein an on-demand database service might be used.

FIG. 4 illustrates a block diagram of an environment 410 wherein an on-demand database service might be used. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in FIG. 4 (and in more detail in FIG. 5) user systems 412 might interact via a network 414 with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" will be used interchangeably herein. A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

One arrangement for elements of system 416 is shown in FIG. 4, including a network interface 420, application platform 418, tenant data storage 422 for tenant data 423, system data storage 424 for system data 425 accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTPS client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 412 to access, process and view information, pages and applications available to it from system 416 over network 414. Each user system 412 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application (s) including computer code to run using a central processing unit such as processor system 417, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used, (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 5:
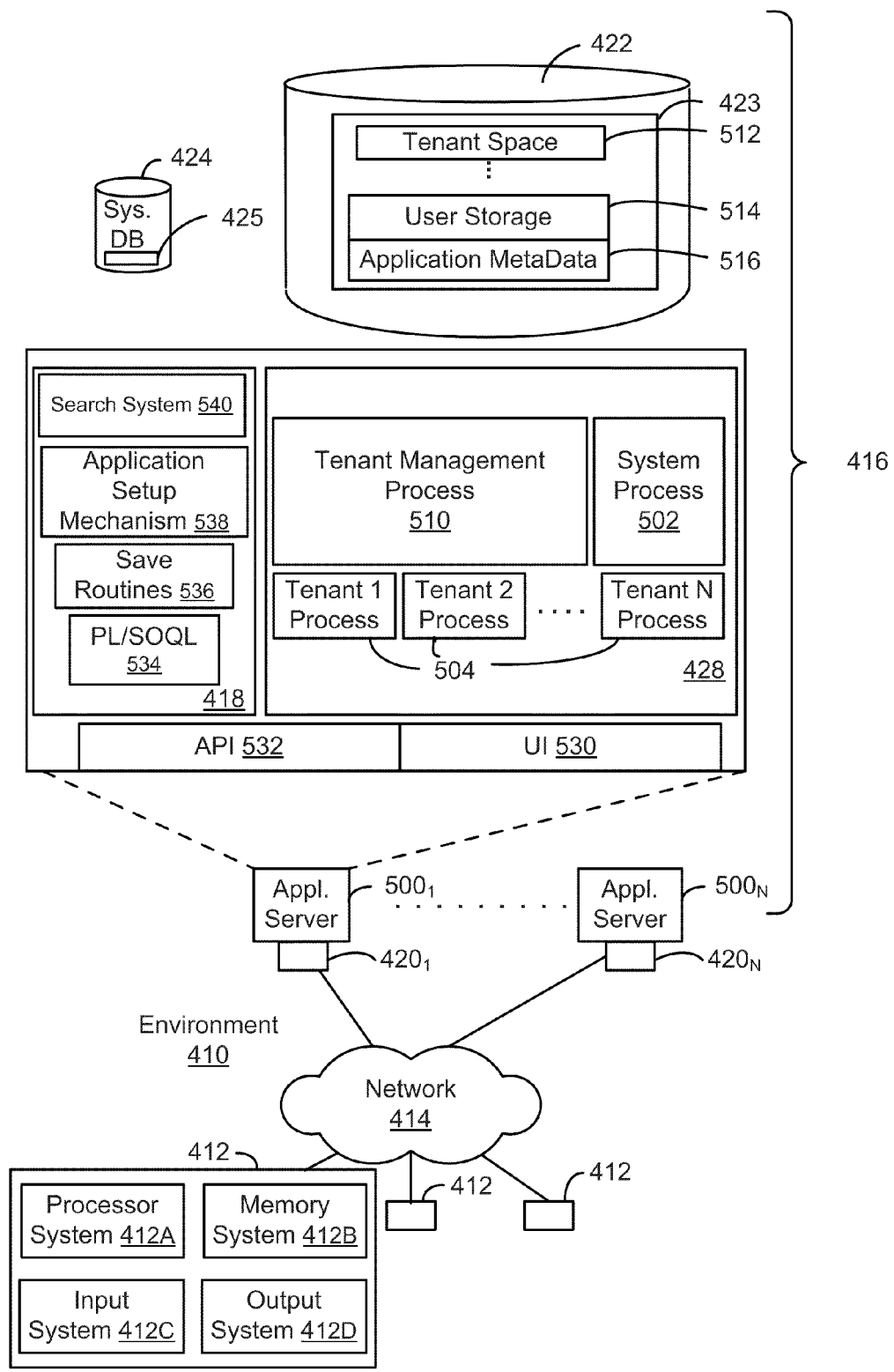
FIG. 5 illustrates a block diagram of an embodiment of elements of FIG. 4 and various possible interconnections between these elements.

FIG. 5 also illustrates environment 410. However, in FIG. 5 elements of system 416 and various interconnections in an embodiment are further illustrated. FIG. 5 shows that user system 412 may include processor system 412A, memory system 412B, input system 412C, and output system 412D. FIG. 5 shows network 414 and system 416. FIG. 5 also shows that system 416 may include tenant data storage 422, tenant data 423, system data storage 424, system data 425, User Interface (UI) 530, Application Program Interface (API) 532, PL/SOQL 534, save routines 536, application setup mechanism 538, applications servers $500_1$-$500_N$, system process space 502, tenant process spaces 504, tenant management process space 510, tenant storage area 512, user storage 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of one or more processors. Memory system 412.13 may be any combination of one or more memory devices, short term, and/or long term memory. Input system 412C may be any combination of input devices, such as one or more keyboards, mice, trackballs, scanners, cameras, and/or interfaces to networks. Output system 412D may be any combination of output devices, such as one or more monitors, printers, and/or interfaces to networks. As shown by FIG. 5, system 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage areas 512, which can be either a physical arrangement and/or a logical arrangement of data. Within each tenant storage area 512, user storage 514 and application metadata 516 might be similarly allocated for each user. For example, a copy of a user's most recently used (MRU) items might be stored to user storage 514. Similarly, a copy of MRU items for an entire organization that is a tenant might be stored to tenant storage area 512. A UI 530 provides a user interface and an API 532 provides an application programmer interface to system 416 resident processes to users and/or developers at user systems 412. The tenant data and the system data may be stored in various databases, such as one or more Oracle™ databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. Invocations to such applications may be coded using PL/SOQL 534 that provides a programming language style interface extension to API 532. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manage retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server $500_1$ might be coupled via the network 414 (e.g., the Internet), another application server $500_{N-1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, system 416 is multi-tenant, wherein system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product, comprising a non-transitory computer usable medium having a computer readable program code embodied therein, the computer readable program code adapted to be executed to implement a method for testing an aspect of a user interface determined from a database dedicated to the testing, the method comprising:
   identifying a user interface including a graphical user interface (GUI) having at least one aspect determined from a first database during production of the user interface, where the at least one aspect of the user interface includes an error message displayed utilizing the GUI in response to an error condition associated with the first database occurring during the production of the user interface;
   determining the at least one aspect of the user interface from a second database; and
   testing the at least one aspect of the user interface determined from the second database.

2. The computer program product of claim 1, wherein the at least one aspect of the user interface includes a visible aspect of the GUI.

3. The computer program product of claim 1, wherein the second database stores the error message for determining the at least one aspect of the user interface from the second database.

4. The computer program product of claim 1, wherein the at least one aspect of the user interface is determined during the production of the user interface based on a plurality of transactions performed utilizing the first database.

5. The computer program product of claim 4, wherein the at least one aspect of the user interface is determined from the second database by directly reading the at least one aspect from the second database, thereby avoiding the plurality of transactions.

6. The computer program product of claim 1, wherein the first database is shared among a plurality of different applications.

7. The computer program product of claim 1, wherein the first database stores data required to be processed to generate output for use in determining the at least one aspect of the user interface during the production of the user interface.

8. The computer program product of claim 7, wherein the second database stores an instance of the output for use in determining the at least one aspect of the user interface from the second database.

9. The computer program product of claim 1, wherein the second database is unique to a test utilized for the testing of the at least one aspect of the user interface, such that the second database stores data directly utilized by the test.

10. The computer program product of claim 1, further comprising determining whether the user interface is to be tested or published for use by at least one user.

11. The computer program product of claim 10, wherein the determining the at least one aspect of the user interface from the second database is performed in response to a determination that the user interface is to be tested.

12. The computer program product of claim 10, further comprising executing a test controller associated with the user interface in response to a determination that the user interface is to be tested.

13. The computer program product of claim 12, wherein the test controller accesses the second database for determining the at least one aspect of the user interface from the second database.

14. The computer program product of claim 10, further comprising executing a production controller associated with the user interface in response to a determination that the user interface is to be published.

15. The computer program product of claim 14, wherein the production controller accesses the first database for determining the at least one aspect of the user interface from the first database.

16. The computer program product of claim 1, wherein a single instance of the user interface is utilized during production of the user interface and testing of the user interface.

17. A method, comprising:
identifying a user interface including a graphical user interface (GUI) having at least one aspect determined from a first database during production of the user interface, where the at least one aspect of the user interface includes an error message displayed utilizing the GUI in response to an error condition associated with the first database occurring during the production of the user interface;
determining the at least one aspect of the user interface from a second database; and
testing the at least one aspect of the user interface determined from the second database.

18. An apparatus, comprising:
a processor for:
identifying a user interface including a graphical user interface (GUI) having at least one aspect determined from a first database during production of the user interface, where the at least one aspect of the user interface includes an error message displayed utilizing the GUI in response to an error condition associated with the first database occurring during the production of the user interface;
determining the at least one aspect of the user interface from a second database; and
testing the at least one aspect of the user interface determined from the second database.

* * * * *